Jan. 27, 1925.
A. L. BAUSMAN
1,524,230
METHOD AND APPARATUS FOR BOTTOM COATING CONFECTIONS AND THE LIKE
Filed Jan. 7, 1924  2 Sheets-Sheet 1
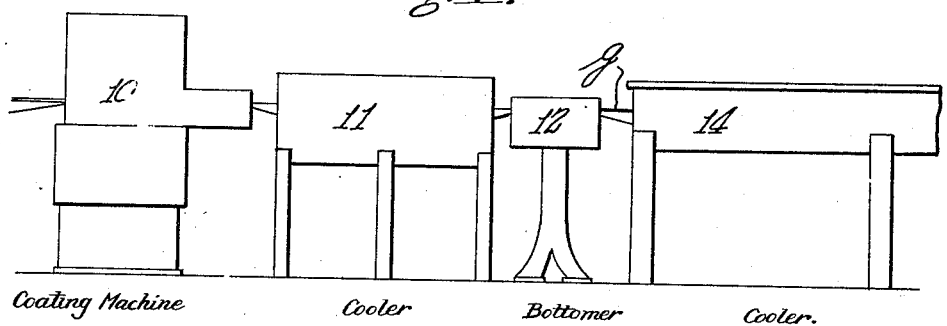
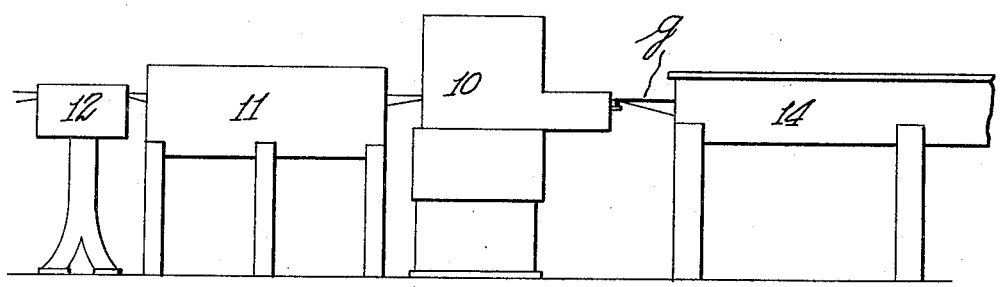
INVENTOR
Alonzo Linton Bausman
BY Chapin & Neal
ATTORNEYS Jan. 27, 1925.
A. L. BAUSMAN
1,524,230
METHOD AND APPARATUS FOR BOTTOM COATING CONFECTIONS AND THE LIKE
Filed Jan. 7, 1924  2 Sheets-Sheet 2
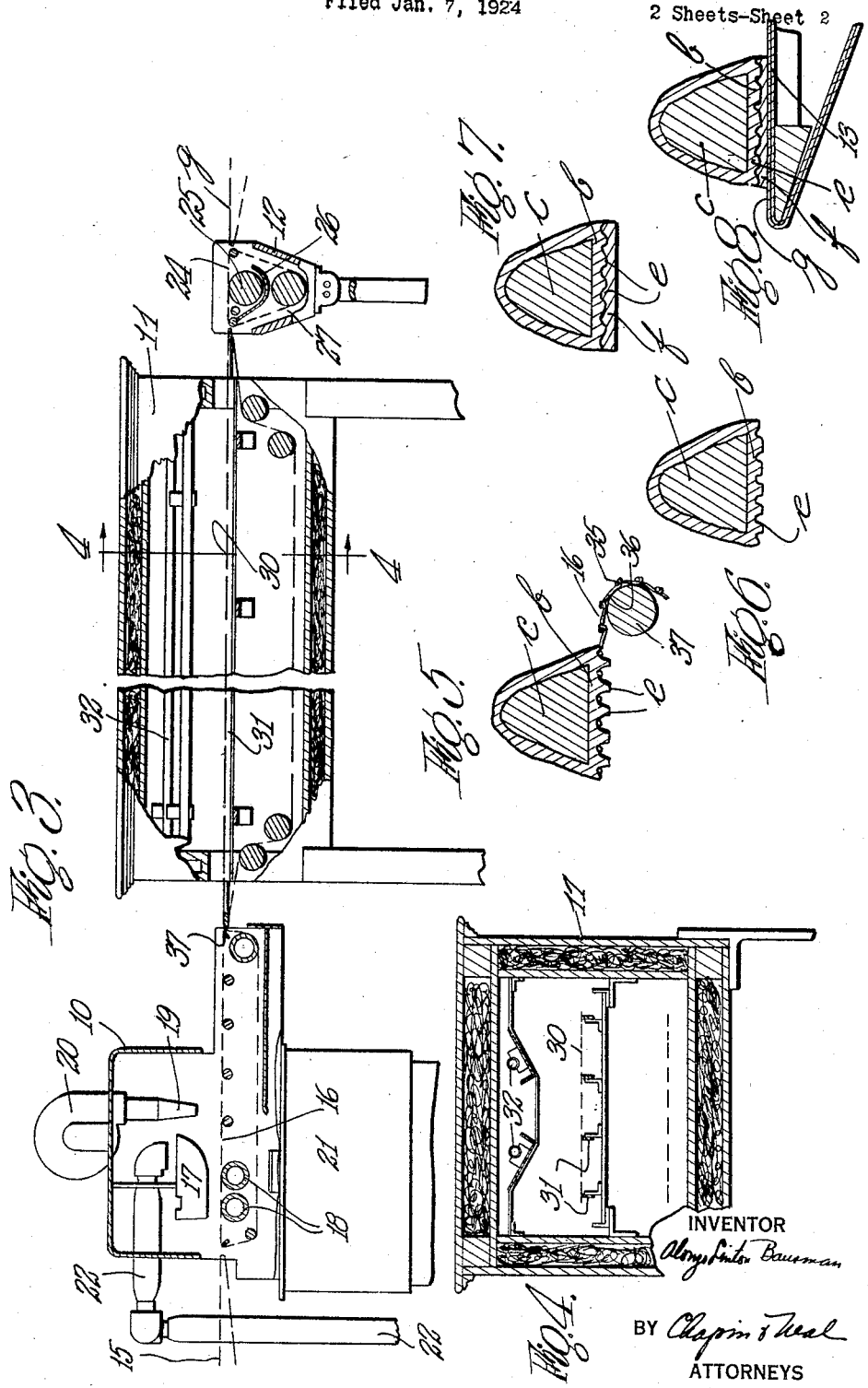
INVENTOR
Alonzo Linton Bausman
BY Chapin & Neal
ATTORNEYS Patented Jan. 27, 1925.

1,524,230

UNITED STATES PATENT OFFICE.

ALONZO LINTON BAUSMAN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS.

METHOD AND APPARATUS FOR BOTTOM-COATING CONFECTIONS AND THE LIKE.

Application filed January 7, 1924. Serial No. 684,795.

*To all whom it may concern:*

Be it known that I, ALONZO LINTON BAUSMAN, a citizen of the United States, residing at Springfield, in the county of Hampden and State of Massachusetts, have invented new and useful Improvements in Methods and Apparatus for Bottom-Coating Confections and the like, of which the following is a specification.

This invention relates to a method and apparatus for coating confections and is particularly directed to improvements in the bottom coating of confections.

The problem of providing a satisfactory bottom coating on confections, coated by machines of the fountain feed type, is one which presents many difficulties. The bottom coating is apt to be thinner than the coatings on the top and side walls of the confections due to the squeezing out of some of the coating, while still in a plastic state, by the weight of the confections. The confections are usually transferred, before the coating has set, to a delivery belt having a smooth surface which is impervious to the coating material, usually chocolate. Consequently, since the confections are supported on this belt by their bottom coatings, the weight of the confection causes the bottom coatings to be compacted and pressed out to some extent. To overcome this difficulty, a bottom coating has been applied to the confections, prior to their entrance into the coating machine, and this first bottom coating has been chilled so as to function as a support during the operation of completely coating the confections, which operation includes the application of a second bottom coating. This practice is not, however, a complete solution of the problem for the confections are carried from the first bottom coating device to the coating machine by a smooth impervious belt and, although this belt travels over a cooling table, some of the plastic bottom coating is squeezed out in the same manner as above described, before it can be chilled. The difficulty is in getting enough chocolate to stay on the bottom of the confection to form an adequate support during the main coating operation. In general, enough chocolate can be applied to the bottom of the confection but it is difficult to keep it there on account of the "squeezing out" action and, if only a thin bottom coating is left when the confection enters the coating machine, much of the beneficial effect is then lost by the softening action which takes place by the application of warm chocolate in the coating machine.

This invention has for its general object the provision of a method of, and a means for, retaining on the confections an adequate and substantial amount of the first application of bottom coating to support the weight of the confections during the second bottom coating operation and substantially lessen the disadvantageous effects, heretofore encountered, from the squeezing out of the bottom coating.

In carrying out the invention, use is made of a pervious confection support, preferably a wire belt, on which the confections are supported, or carried, after the application of the first bottom coating and until the coating has hardened and the hardening operation may be accelerated by artificial cooling means. By the use of such a support, as distinguished from the smooth impervious support heretofore used in the same general location and for the same primary purpose, an adequate amount of the first bottom coating may be retained on the confections. In fact, the coating, dripping downwardly, forms substantial depending ridges between the wires of the pervious support and, by cooling the coating while on such support, these ridges are retained and later utilized as legs to limit the degree to which the confections can sink into the subsequently applied final bottom coating.

The invention may be practiced by applying the first bottom coating in the usual bottom coating device outside the coating machine and applying the final bottom coating in said machine at the same time that the tops and sides of the confections are coated. This arrangement possesses a certain advantage in that the color and appearance of the product will tend to be uniform without special care being taken to insure it. However, the confections may first be completely coated in the usual coating machine and the second bottom coating subsequently applied. Naturally, more care will be necessary with this latter arrangement in order to secure uniformity of color and appearance between the bottom and the remaining coatings than with the arrangement first described but, on the other hand, there is less tendency to soften the legs formed in the first bottom coating during the application of the second bottom coating because the confections remain in the bottoming device for considerably less time than in the coating machine.

In connection with the invention, it is desirable to accelerate the hardening of the first bottom coating by some special cooling means, although it is within the province of the invention to allow the coating to harden in the natural manner without special provisions for this purpose.

The invention may be said to make use of a so-called "wiremarked" bottom coating as a preliminary to the final coating operation. The wiremarking, which occasionally occurs due to improper temperature regulation in the coating machine, is according to this invention purposely made to occur at one stage in the coating operation and preferably to a greater degree than is ordinarily the case.

The invention will more particularly appear from the following description and the illustrative embodiment of the invention in the accompanying drawings, in which:—

Fig. 1 is a small scale elevational view, largely in conventional form, showing one arrangement of the different units of the apparatus;

Fig. 2 is a similar view showing another arrangement of these units;

Fig. 3 is a somewhat enlarged sectional elevational view showing in detail the more essential parts of the apparatus shown in Fig. 2;

Fig. 4 is a cross-sectional view taken on the line 4—4 of Fig. 3; and

Figs. 5, 6, 7, and 8 are large scale detail views showing the various steps in the operation of bottom coating the confections.

Referring to these drawings and particularly to Figs. 5, 6, 7 and 8, the method consists in applying to a confection, such as $a$, a first bottom coating, such as $b$, of the desired material, usually chocolate. The confection, if not already on a pervious support when bottom coated, is then placed on such a support which may be an open work affair of any suitable character and which may, for example, be a wire belt 16. The confection is supported from the member 16 by means of its bottom coating and the weight of the confection will cause the bottom coating to be squeezed out to some degree but the squeezing out action occurs only at intervals and is not effective over the entire bottom area of the confection, as formerly. Also, an excess of coating is usually applied in the bottom coating operation, much of which is later wiped off, and this excess dripping downwardly from the base of the confection forms projections, such as $e$, usually in the nature of cross ridges. The bottom coating is allowed to cool while the confection is on the support 16, either naturally or artificially, and thereby these ridges are retained, rather than wiped off as formerly. The second bottom coating is then applied, as indicated at $f$ in Fig. 7, and while the ridges $e$ may soften somewhat during the application of the coating $f$, their height is such that substantial legs will remain after such application. The confection is then placed on a support $g$, having a smooth surface and one which is impervious to the coating material. The surface of support $g$ may consist of waxed paper, oil cloth or the like. The weight of the confection presses the bottom coating against the smooth surface $g$ and smooths out the bottom coating, giving it a nice glazy surface. While the confection, due to its weight, also sinks into the coating $g$ and squeezes out some of it, nevertheless all of the coating $g$ is not squeezed out and at least as much remains as in former methods and this much, plus the height of the legs $e$, gives a considerably heavier coating than can be effected by the methods ordinarily used heretofore. The legs $e$ effectively limit the degree to which the confection can settle into the final bottom coating and the method is characterized by retaining a great deal more of the first bottom coating by this arrangement, which permits the formation of such legs, than can be retained by former methods.

The method has been described as it might be practiced by hand. It may equally well and preferably is, carried out automatically and an exemplary apparatus for this purpose will now be described. This apparatus, in its broader aspects consists, of two separated bottom coating devices and a pervious support disposed therebetween, such support preferably being a movable one, in the nature of a wire belt, in order to carry the confections from one coating device to the other. Thus, in Fig. 1, a coating machine 10, of well known form, is employed for applying the first bottom coating as well as the top and side coatings, which are usually desired. The confections are then cooled, preferably although not necessarily by artificial means, such as the cold box 11, after which the final bottom coating is applied by a so-called bottoming device 12, also of well known form. The confections are then transferred to the smooth impervious support $g$, which may also be in the nature of a belt, usually driven by an underlying belt, such as 13 (Fig. 8). While the confections may be finally cooled in any suitable manner they are herein shown as being cooled by a cold box 14, through which they are carried by the belt g. As above described, the first bottom coating may be applied by the usual bottoming device 12, then chilled, as by the cold box 11 or otherwise, and the second bottom coating as well as the top and side coatings may be applied in the coating machine 10, all as indicated in Fig. 2.

Referring now to the details of the apparatus shown in Fig. 3, the coating machine 10 and the bottom device 12, illustrated herein, are of the general type shown in my prior U. S. Letters Patent No. 1,323,948 granted December 2, 1919. Other types may equally well be used, however, and those shown herein are given as illustrative examples of types which have been found suitable for the purpose. The coating machine includes a confection feed belt 15, a pervious coating belt 16, usually of wire mesh, a shower pan 17 for delivering a downward flow of coating material upon the tops and sides of the confections as they travel thereinunder on belt 16, bottom coating rolls 18 which pick up some of the coating passing through belt 16 and apply the same to the bottoms of the confections while on belt 16. The confections, after passing the shower pan 17, travel on belt 16 long enough to allow superfluous coating to drain therefrom and usually are subjected to a blast of air from a nozzle 19, supplied from a fan 20 for the purpose of removing excess coating. Chocolate, or other coating, is supplied to shower pan 17 from a supply tank 21 by means of conduits 22. A more complete disclosure of the coating machine may be had by reference to the above identified patent.

The bottoming device 12 includes a wire mesh conveyer 24 having its upper lap of travel in line with, and in the same plane as, conveyer 16. Underlying this conveyer, intermediate its ends, is a bottoming roll 25 and underlying the latter is a pan 26 which is kept supplied with chocolate. The roll 25 picks up some of the coating and applies it to the bottoms of the confections while travelling on the upper stretch of conveyer 24. Excess coating drains back into a tank 27. To secure uniformity in color and appearance between the coating applied in device 12 and that applied in machine 10, the coating for the former is preferably supplied from the latter as disclosed in the patent, above identified.

With the arrangement just described the conveyer 16 might deliver directly to conveyer 24 provided that it is extended sufficiently to allow the bottom coatings to be cooled and thereby "wiremarked". A virtual extension of the conveyer 16 is shown in Fig. 3 in the form of an intermediate belt 30 of similar construction. Usually, however, it is desirable to make the space between the units 10 and 12 as short as possible and to accelerate the cooling of the bottom coatings in which cases artificial cooling means are employed. As an example of one suitable means, a cold box 11 is shown in Fig. 3 and the wire belt 30 is arranged to travel through this box, being suitably supported in its upper lap of travel, as by laterally-spaced, longitudinally-disposed bars 31 (Fig. 4). Conduits 32 are disposed within box 11 for the circulation of a cooling medium.

With the apparatus shown in Fig. 3, the pervious support, on which the confections are carried during the formation of the legs or ridges e, is the usual wire belt 16 of the coating machine. This wire belt includes cross wires 35 which support the confections and connecting longitudinal portion 36. The conveyer 16, at its delivery end, travels around a roll 37 and the portions 36 of the belt serve to hold the cross wires 35 away from the roll so that the latter cannot wipe off the bottom coating to the level of the underside of the cross wires 35. While the legs e, as originally formed, may be so long that some portion thereof is wiped off by roll 37, there will still be left legs of substantial length. The confection after leaving belt 16 may have more the appearance shown in Fig. 6, wherein the legs e have been cut off somewhat but not eliminated.

It has been pointed out that the first bottom coating may be also chilled on conveyer 16, in which case the excess portions of legs e, as originally formed, might be knocked off by roll 37, as distinguished from being wiped off while in a plastic state. The final result, however, would be substantially the same. In case, the apparatus shown in Fig. 2 is used, the end roll for conveyer 24 functions in a similar manner to that just described. The extent of the legs e can, of course be controlled, as desired, by varying the amount by which the wires 35 are spaced from roll 37.

The operation of the apparatus will sufficiently appear from the foregoing description.

It will be apparent from the foregoing description that the invention is characterized by retaining enough of the first bottom coating to serve its intended purpose during the second bottom coating operation. While the means, heretofore used, will apply sufficient amounts of bottom coating, the difficulty has been in retaining a sufficient amount of the applied bottom coating and this invention overcomes this difficulty by the use of pervious conveying means for supporting the confections until the first bottom coating has hardened. As shown, the supporting and conveying means between both bottom coating means is entirely of a pervious nature but this is not necessarily essential for the desired function of the type of conveying and supporting means is accomplished as soon as the legs e have been hardened.

I believe myself to be the first to bottom coat confections by the method and with the apparatus herein described and I desire to claim my invention in the broadest possible legal manner.

What I claim is:

1. In combination, means for applying a bottom coating to confections, supporting means of a pervious nature for the coated confections on which means the bottom coatings rest until they are hardened, and means for subsequently applying a second bottom coating to the confections.

2. In combination, means for applying a bottom coating to confections, pervious conveying means for carrying the confections during the application of said coating and for a sufficient time thereafter to allow said coatings to harden, and means for subsequently applying a second bottom coating to the confections.

3. In combination, means for applying a bottom coating to confections, supporting means of a pervious nature for the coated confections on which means the bottom coatings rest until they are hardened, and means for subsequently completely coating the confections including the application of a second bottom coating.

4. In combination, a bottom coating device, a confection coating machine, and conveying means of a pervious nature to carry the confections from said device to said machine and on which means the bottom coatings are hardened prior to the entrance of the confections into said machine.

5. In combination, a bottom coating device, a confection coating machine, conveying means of a pervious nature to carry the confections from said device to said machine, and means to chill the bottom coatings while on said means and prior to the entrance of the confections into said machine.

6. In combination, means for applying a bottom coating to confections, supporting means of a pervious nature for the coated confections on which means the bottom coatings rest, means for cooling said bottom coatings, and means for subsequently applying a second bottom coating to the confections.

7. In combination, means for applying a bottom coating to confections, supporting means of a pervious nature for the coated confections on which means the bottom coatings rest until they are hardened, means for subsenquently applying the second bottom coating to the confections, apparatus for effecting a final cooling of the confections, and conveying means having a smooth impervious surface for carrying the confections through said apparatus.

8. In combination, means for applying a bottom coating to confections, pervious conveying means for carrying the confections during the application of said coating and for a sufficient time thereafter to allow said coatings to harden, means for subsequently applying a second bottom coating to the confections, apparatus for effecting a final cooling of the confections, and conveying means having a smooth impervious surface for carrying the confections through said apparatus.

9. In combination, a bottom coating device, a confection coating machine, conveying means of a pervious nature to carry the confections from said device to said machine, means to chill the bottom coatings while on said means and prior to the entrance of the confections into said machine, apparatus for effecting a final cooling of the confections, and conveying means having a smooth impervious surface for carrying the confections through said apparatus.

10. In combination, means for applying a bottom coating to confections, supporting means of a pervious nature for the coated confections on which means the bottom coatings rest until they are hardened, means for subsequently completely coating the confections including the application of a second bottom coating, apparatus for effecting a final cooling of the confections, and conveying means having a smooth impervious surface for carrying the confections through said apparatus.

11. The method of bottom coating confections, which consists in applying a first bottom coating, in permitting said coating to harden while resting on an open work support, whereby indentations are formed in said coating, and in subsequently applying a second bottom coating to the confections.

12. The method of bottom coating confections, which consists in applying a first bottom coating, in permitting said coating to harden while resting on an open work support, whereby indentations are formed in said coating, in subsequently applying a second bottom coating to the confections, and in cooling the bottom coatings while the latter are supported on a smooth impervious surface.

13. The method of bottom coating confections which consists in producing a wiremarked bottom coating, and in applying a second bottom coating to the first named coating after the same has become hardened.

14. The method of coating confections, which consists in producing a wiremarked bottom coating, in subsequently applying a second bottom coating, and at the same time completing the coating of the confection.

15. The method of bottom coating confections, which consists in applying a first coating and causing portions of the coating to depend below the body thereof, in chilling the coating in such form, in subsequently applying a second and smooth bottom coating, and in finally cooling the confection.

16. The method of bottom coating confections, which consists in applying a first bottom coating, in forming from such coating depending legs, in cooling said coating and legs, in applying a second bottom coating, in smoothing the last named bottom coating, and in cooling the same while in smooth form.

17. In combination, means for applying a bottom coating to confections, confection supporting means on which the coated confections rest until the bottom coating is hardened, said confection supporting means having separated confection supporting portions and intervening portions into which portions of the bottom coating may extend, and means for subsequently applying a second bottom coating to the confections.

18. In combination, means for applying a bottom coating to confections, conveying means for carrying the confections during the application of said coating and for a sufficient time thereafter to allow said coatings to harden, said conveying means having separated confection supporting portions and intervening portions into which parts of the bottom coating may extend, and means for subsequently applying a second bottom coating to the confections.

In testimony whereof I have affixed my signature.

ALONZO LINTON BAUSMAN.